June 28, 1932.  R. M. AOKI  1,865,294
DIRIGIBLE LIGHT
Filed Oct. 6, 1930   3 Sheets-Sheet 3
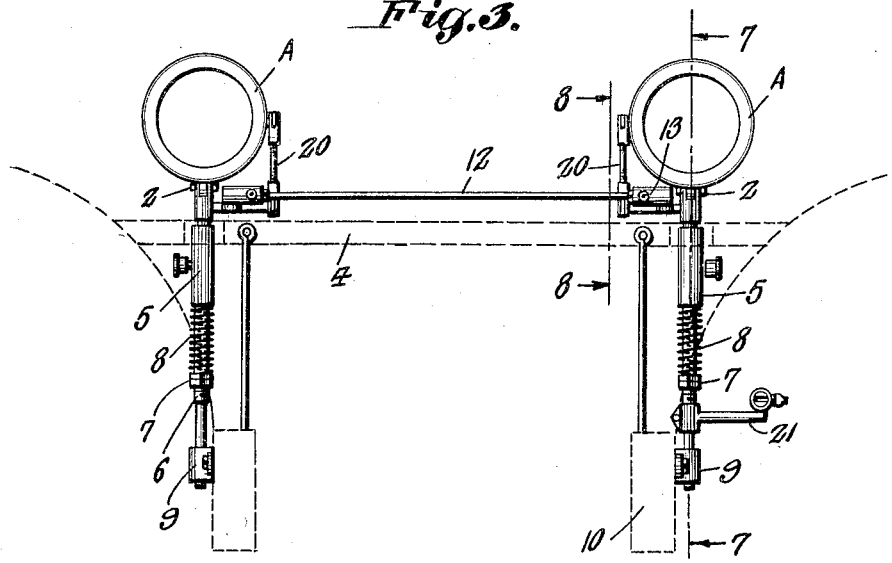
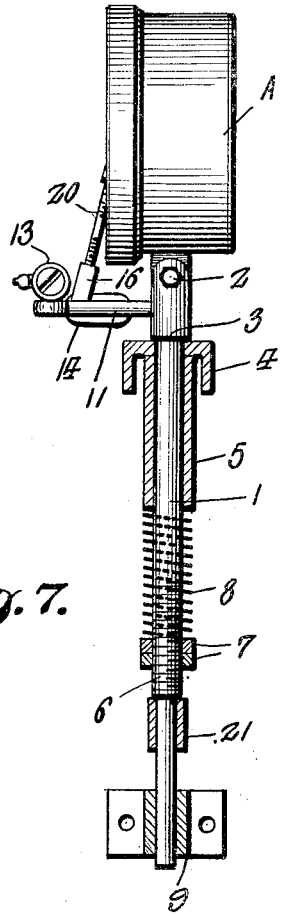
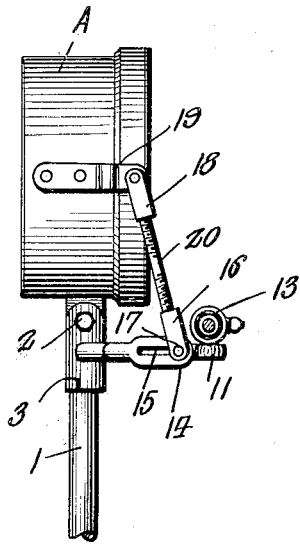
R. M. Aoki, INVENTOR
BY Victor J. Evans
ATTORNEY Patented June 28, 1932

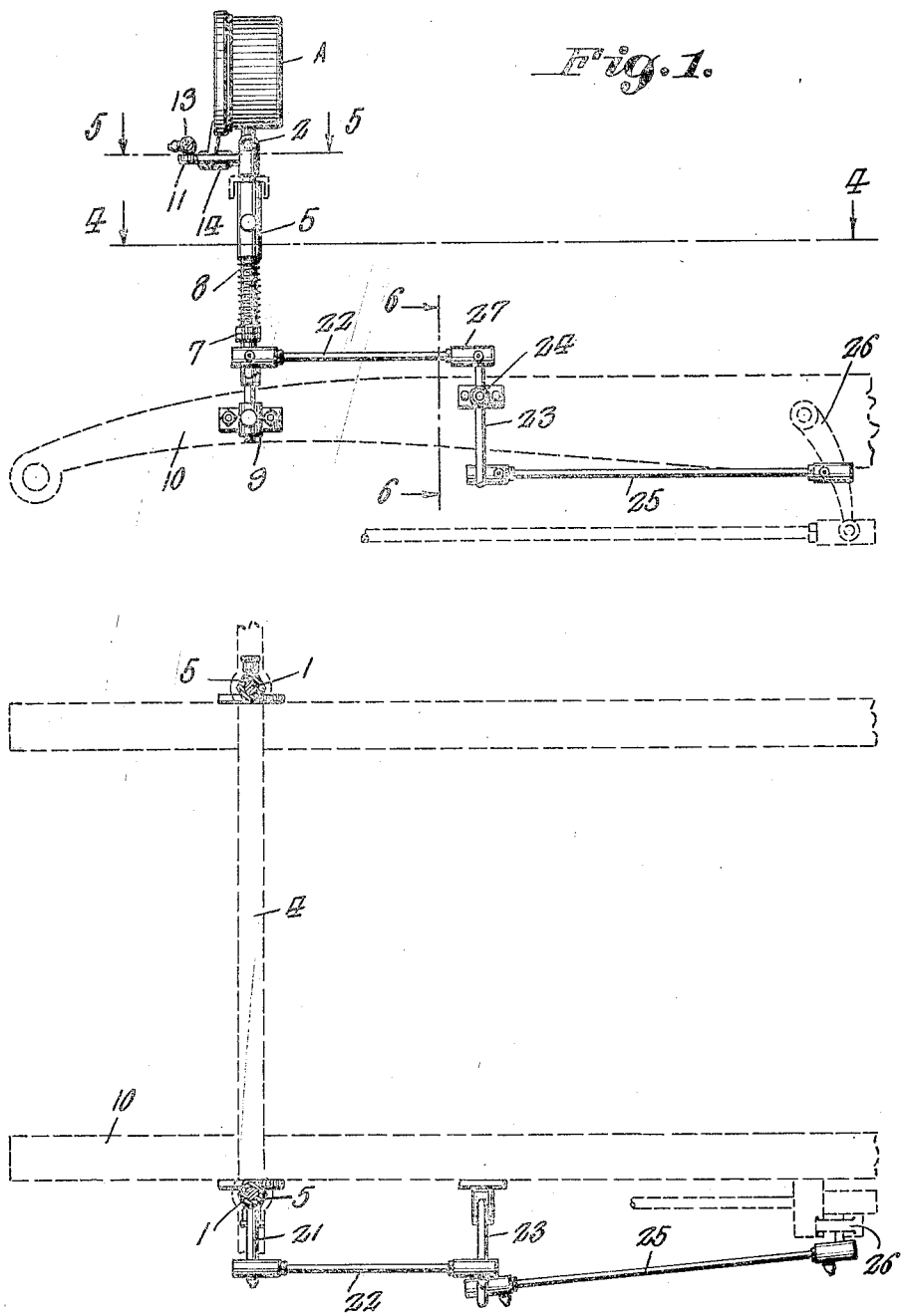

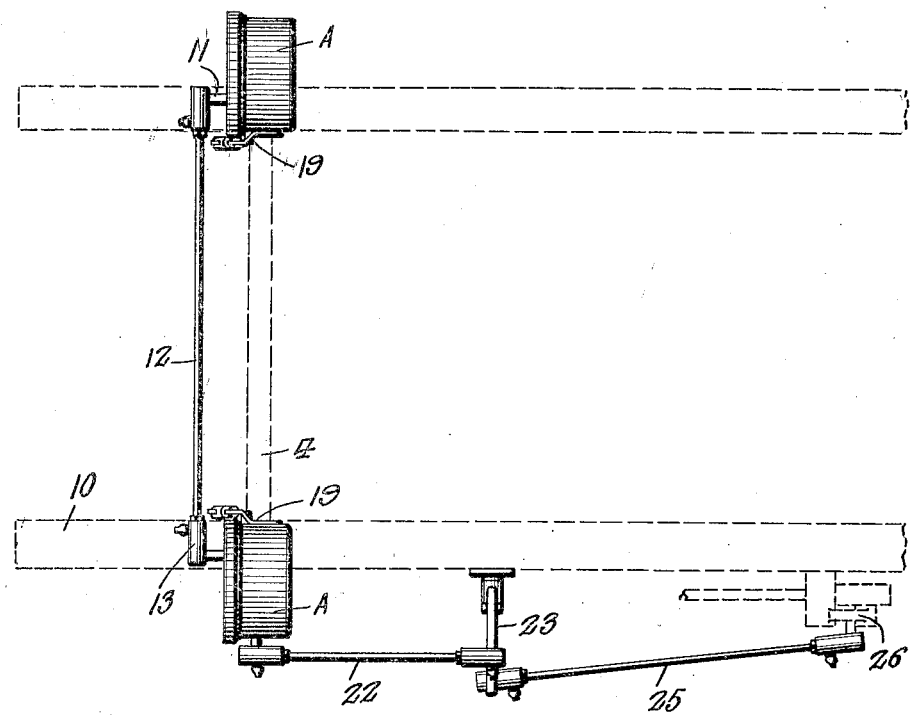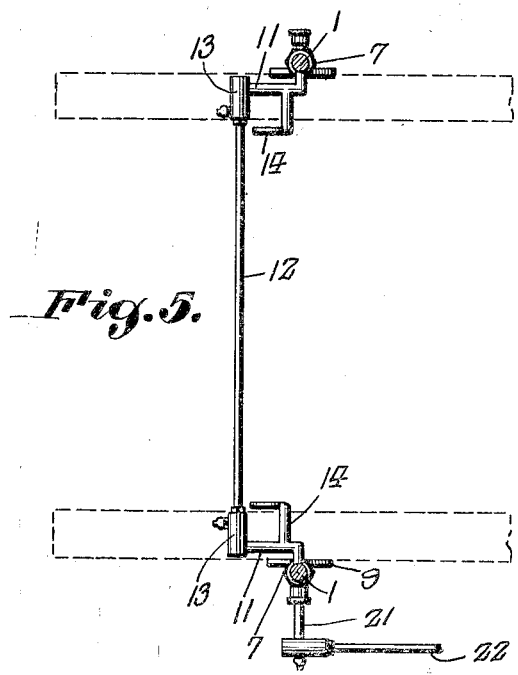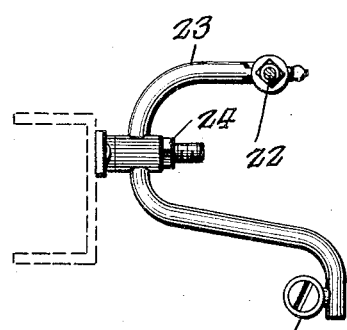

1,865,294

UNITED STATES PATENT OFFICE

RAY MASARU AOKI, OF KONA, TERRITORY OF HAWAII

DIRIGIBLE LIGHT

Application filed October 6, 1930. Serial No. 486,844.

This invention relates to dirigible headlamps for motor vehicles and the like, the general object of the invention being to provide means for causing the lamps to move with the steering mechanism so that the rays of light will illuminate curves in the road as the vehicle is rounding the same, with means for preventing the shocks and jars incident to the travel of the vehicle from being communicated to the lamps.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is an elevation of the invention, with a part of the vehicle shown in dotted lines.

Figure 2 is a top plan view.

Figure 3 is a front view.

Figure 4 is a section on line 4—4 of Figure 1.

Figure 5 is a section on line 5—5 of Figure 1.

Figure 6 is a section on line 6—6 of Figure 1.

Figure 7 is a section on line 7—7 of Figure 3.

Figure 8 is a section on line 8—8 of Figure 3.

In these drawings, the letter A indicates the lamps of a vehicle and the numeral 1 indicates the post of each lamp. The lamp is hingedly connected to the top of the post, as shown at 2, so that the lamp can be moved about a horizontal axis and each post is formed with a shoulder 3 adjacent its upper end which rests on the channel-shaped member 4 which has its ends connected with the fenders of the vehicle, as shown in Figure 3. A depending sleeve 5 is welded or otherwise secured to the member 4 and the post passes through said sleeve. Each post is formed with a threaded part 6 to receive the nuts 7 and a spring 8 encircles the post and bears against the lower end of the sleeve and the top nut. A bearing member or bushing 9 is fastened to each side member 10 of the chassis and the lower end of each post is reduced and passes through said bearing member. An arm 11 is connected with the top part of each post and extends forwardly therefrom and the two arms are connected together by the rod 12, the ends of which are connected with the ends of the arms by the ball and socket connections shown generally at 13. Each arm 11 is formed with an annular extension 14, the outer part of which is slotted, as shown at 15. A socket member 16 has a bolt 17 passing therethrough which also passes through the slot 15 and a second socket member 18 is pivoted to a bracket 19 attached to the inner side of each lamp. The sockets are connected together by the rod 20 which has oppositely arranged threads at its ends for engaging internal threads in the sockets so that the position of the lamp on the post can be adjusted in order to properly direct the rays of light therefrom.

An arm 21 is connected to the lower part of one of the lamp posts and a link 22 connects said arm with the upper end of a lever 23 pivoted to the side member 10 of the chassis intermediate its ends, as shown at 24, and a second link 25 connects the lower end of the lever with the arm 26 of the steering mechanism. The links 22 and 25 are attached to the parts to which they are connected by the ball and socket joints shown generally at 27. The lever 23 is of substantially U shape, as shown in Figure 6.

From the foregoing it will be seen that movement of the steering mechanism of the vehicle will be imparted to one of the posts through the connections shown at 22, 23, 25 and 26 so that said posts will be turned and turning movement of this post will be communicated to the other post through the rod 12. Thus both the lamps will be turned in a horizontal plane simultaneously so that the rays of light from the lamps will follow the road on turns as well as on straight portions. The springs 8 act as shock absorbers and by means of the nuts 7, the tension of the springs can be adjusted. The lamps can also be adjusted to properly direct the rays of light upon the road through means of the links 20, which are adjustable as to their length and which are adjustably connected with the extensions 14 of the arms 11.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In a dirigible head lamp for a motor vehicle, a sleeve adapted to abut at its upper end a cross bar connected with the fenders of the motor vehicle, a post engaged in the sleeve and having a shoulder resting upon said cross bar, a lamp body pivoted to the post above the shoulder for vertical swinging movement, a tensioning device operating upon the post and sleeve to hold the shoulder in contact with the cross bar, an arm projecting from the post and having an outer slotted portion, a bracket carried at one side of the lamp body, an adjustable rod pivoted to said bracket and slidably connected with the slotted end of said arm, and an operative bill and socket connection with said arm.

In testimony whereof I affix my signature.

RAY MASARU AOKI.